3,342,047
ROLLING MILLS
Peter Richard Ashworth Briggs, Sheffield, England, assignor to The British Iron and Steel Research Association, London, England
Filed Sept. 17, 1964, Ser. No. 397,129
Claims priority, application Great Britain, Sept. 17, 1963, 36,510/63
12 Claims. (Cl. 72—8)

ABSTRACT OF THE DISCLOSURE

This invention is concerned with an automatic control system for a rolling mill designed to control the mill to roll material to constant gauge. It employs a main detector, which detects the thickness of the material in the bite of the rolls and which controls the mill, and a supplementary detector which detects the thickness of the material before it enters the rolls, and which, on detection of change of thickness, conditions the mill adjustment for immediate reaction to consequential thickness change detected by the main detector.

---

This invention relates to automatic control systems for rolling mills and is particularly, but not exclusively concerned with the type of control system for rolling mills described in United States Patent No. 3,128,630, issued April 14, 1964. The systems described in those specifications detect the thickness of the strip at the instant of leaving the rolls of the mill and therefore are able to adjust the mill to compensate for off-gauge material considerably quicker than those systems employing an X-ray or other gauge located some distance from the roll gap. While the systems described in those specifications have improved performance, they are still subject to delays occurring between the detection of off-gauge strip and correction, due to the delays in the control elements, such as delays in the operation of the contactors in the motor control system for the screwdown motors, and in the inertia of the screwdown motors themselves.

In the present invention, there is provided a detector arranged to detect changes in the thickness of the material entering the mill and to initiate the operation of the control system in advance of the detection of changes in the thickness of the strip leaving the mill. In this way, it is possible to eradicate, or reduce, the amount of off-gauge material caused by the delays in the control circuit for the mill.

Thus, according to one aspect of the present invention, an automatic control system for a rolling mill comprises a main detector for detecting changes in the thickness of the material leaving the mill and for controlling the mill to eradicate or reduce those changes, and a supplementary detector arranged to detect changes in the thickness of the strip entering the mill and to initiate the control operation in advance of the detection of the outgoing thickness changes by the main detector.

Preferably, the system comprises a main detector for detecting changes in the thickness of the material leaving the mill, control means for controlling the mill to adjust the gauge of the outgoing material, gating means for operating the control means when the change detected by the main detector exceeds a given value, and a supplementary detector arranged to detect changes in the thickness of the material entering the mill and to reduce from the given value the value of the change at which the gating means operate the control means, so that the control system is initiated into operation before the main detector senses the given value of outgoing thickness change resulting from the detected ingoing thickness change.

The control means may control the mill by adjustment of the roll separation and/or by adjustment of the tension applied to the material at the outgoing and/or ingoing side of the mill.

Figure 1:
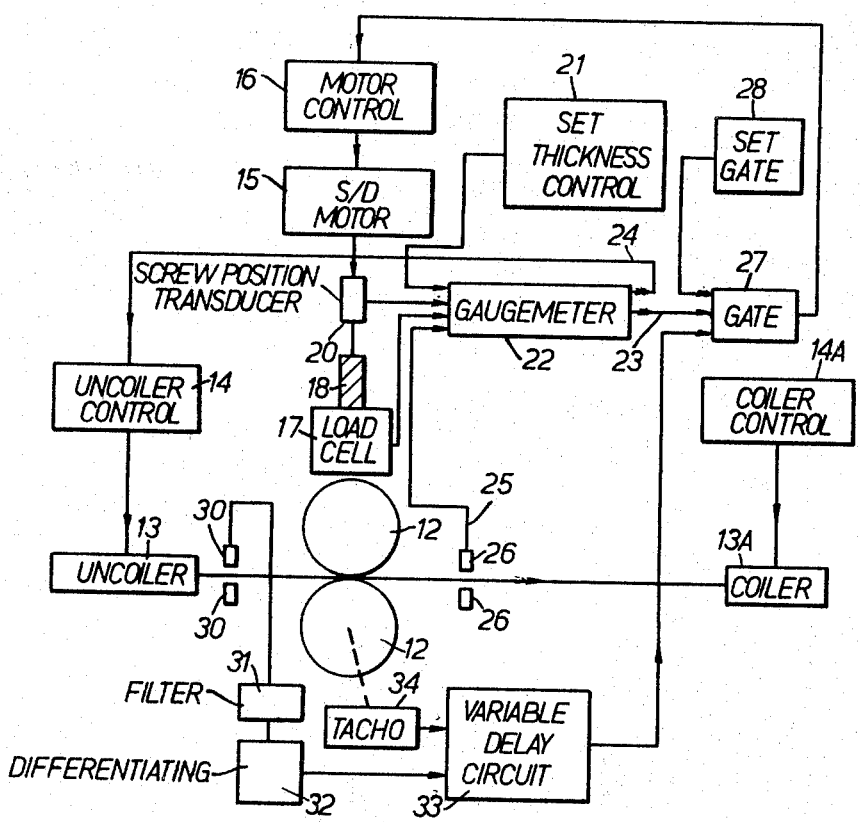
Figure 2:
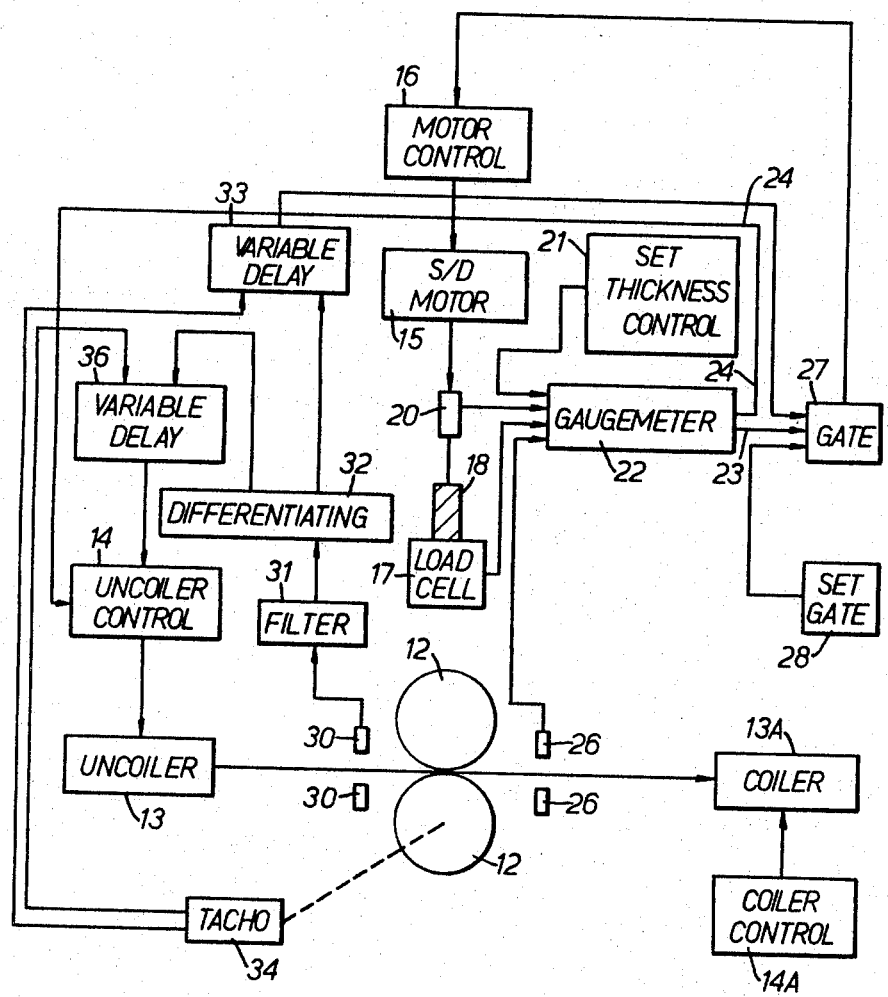
Figure 3:
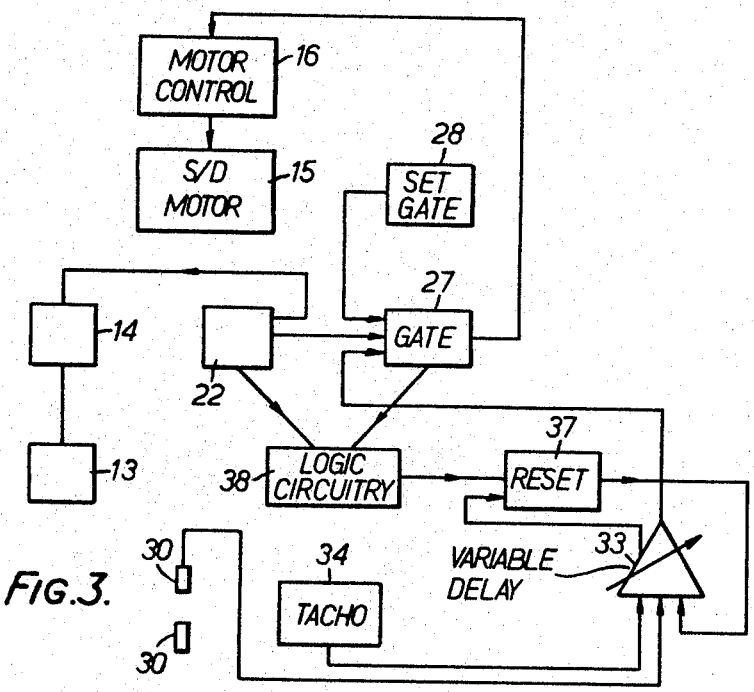

The invention will be more readily understood by way of example from the following description of rolling mill control systems in accordance therewith, reference being made to the accompanying schematic drawings of which FIGURES 1 and 2 illustrate two such systems, while FIGURE 3 shows a modification of parts of the system of FIGURE 1.

In FIGURE 1, a reversing rolling mill is schematically illustrated by the work rolls 12, the uncoiler 13 and the coiler 13A, the strip passing from the uncoiler 13 to the rolls 12 and thence to the coiler 13A in the direction indicated by the arrow. The uncoiler 13 has a control circuit 14, by which the tension at the ingoing side of the rolls 12 may be adjusted; the coiler 13A has a similar control circuit 14A for adjusting the tension in the strip at the downstream side of the rolls. The separation of the rolls 12 is adjusted by a screwdown motor 15 which is controlled by a motor control circuit 16.

The mill has a gauge error detector which is preferably of the form described in the before-mentioned Patent No. 3,128,630. As described in that patent, signals proportional to the rolling load in the mill, to the setting of the rolls, and to the thickness required of the strip are obtained respectively from load cells 17 located between the screws 18 and the upper roll chocks (not shown), from screw position transducers 20 and from a manually set control device 21. These signals are summed in a circuit 22 to give on the output lines 23, 24 signals proportional to the gauge error, or the departure of the gauge of the strip from the required gauge set on the control device 21. The circuit 22 is also supplied with a signal on line 25 from a direct acting X-ray or other gauge detector 26 arranged downstream of the rolls 12 to give a monitoring effect should the error detection otherwise be subject to long term drift.

The gauge error signal on line 23 is applied to a gate circuit 27 and thence to the motor control circuit 16. The gate circuit 27, which is preferably a transistor level switch, is supplied with a voltage from a manually adjusted controller 28 and operates to prevent passage of a signal from the gate circuit 27 until the voltage on line 23 exceeds that supplied by the controller 28. The gauge error signal on line 24 is applied directly to the uncoiler control circuit 14.

The system described operates to correct for substantial errors in the gauge of the strip leaving the rolls 12. As soon as a gauge error is detected by the circuit 22, the gauge error signal on line 24 operates the control circuit 14 to adjust the tension of the strip on the ingoing side of the rolls in a direction tending to reduce the gauge error to zero. The screwdown motors 15 on the other hand are not operated while the gauge error is below the gate value set by the controller 28; if the gauge error should exceed the gate value, the motor control circuit 16 is operated to adjust the screws 18 to reduce to zero the gauge error.

It will be appreciated that, where the gauge error is relatively large, normally it is not possible to remove it by adjustment of tension, since excessive change in tension may result in either breakage of the strip or complete loss of tension. On the other hand, it is undesirable that the screwdown motor 15 should operate whenever the circuit 22 detects an error in outgoing gauge, since this would produce undue wear on the mill screws. The system described permits control by tension alone while the gauge error is below the gate value, and control by screwdown additionally when the error exceeds that value.

There is little delay present in the tension control circuit, tension being appropriately adjusted almost immediately after detection of gauge error by the circuit 22. However, there are delays inherent in the screwdown control circuit, due to the finite time required for the operation of contactors and other elements in the control circuit 16 and for the screws 18 driven by the motor 15 to start moving. As a result, when removal of gauge error is dependent on screwdown adjustment, complete correction is subject to delay which causes the production of off-gauge strip.

In order to eradicate or reduce the effects of the delays in the screwdown control, the system of FIGURE 1 employs a further direct-acting gauge detector 30, preferably an X-ray gauge, located at the ingoing side of the rolls 12 and designed to detect changes in the ingoing thickness of the strip. The signal from detector 30 is applied through a filter 31 to a differentiating circuit 32 which produces a signal dependent on the rate of change of gauge detected by detector 30. The rate of change signal is applied to a variable delay circuit 33 controlled by a tachometer 34 driven by the rolls 12. The delayed signal from the delay circuit 33 is applied to the gate 27 so as to reduce the gate value set by the controller 28, by an amount dependent on the rate of change of gauge of the ingoing strip.

The delay provided by the circuit 33 is dependent on the speed of the strip and is arranged to have a value slightly less than the transit time of the strip from the detector 30 to the rolls 12. Therefore, when the detector 30 detects a change in the ingoing gauge, the gate value of gate 27 is reduced somewhat before the strip in question reaches the rolls 12. As a result, when the detected change in ingoing gauge is reflected in a change in outgoing gauge, detected by the circuit 22, the screwdown motor control circuit 16 is initiated into operation at a lower value of gauge error. Then, by the time the gauge error reaches the normal gate value, the screwdown motor 15 has already been initiated into operation in the correct direction to compensate for that error. In effect, the action of the detector circuit 22 on the screwdown control has been anticipated by the detected change in ingoing gauge and the delays in the control circuit are eradicated, or at least reduced. When the ingoing gauge ceases to vary, so that there is no rate of change signal from the differentiating circuit 32, the gate value is restored to that set by the controller 28 with the delay provided by the delay circuit 33, but the effect of the contactor operating time and the inertia of the motor 15 and screws 18 are considerably reduced.

The system of FIGURE 2 is generally similar to that of FIGURE 1 and like elements are given like reference numerals. FIGURE 2 however includes provision for causing the tension control of the mill to be operated in advance of the detection of gauge error by the detector circuit 22, in order to reduce the effects of the relatively small delays inherent in the tension control circuit. For this purpose, the differentiated ingoing gauge signal from the differentiating circuit 32 is additionally applied to a second delay circuit 36 also controlled by the tachometer 34. The delayed signal is applied to the uncoiler control circuit 14 in parallel to the gauge error signal from detector circuit 22, so that the tension is appropriately adjusted for any gauge change in advance of the detection of the resulting outgoing gauge error by the detector circuit 22.

The system of FIGURE 3 is also identical with that of FIGURE 1, apart from one modification and only the essential parts of the system are therefore shown. FIGURE 3 differs in the omission of the filter circuit 31 and differentiating circuit 32, and as a result the gate 27 is not controlled by the rate of change detected by the ingoing gauge detector 30. Instead, the signal from detector 30 is arranged to represent the change in gauge from the nominal value of gauge for the ingoing strip for that pass, and that signal is applied directly to the variable delay circuit 33 to reduce the gate value of the gate 27 by an amount dependent on the detected change in ingoing gauge. Once the screwdown motor 15 has been initiated into action, it is desirable to restore the gate value to that set by the controller 28 and for this purpose, there is a reset circuit designed to operate through the delay circuit 33 on the gate 27. The reset circuit is controlled by logic circuitry 38 which in turn is controlled by the gauge detector circuit 22 and the gate 27. The arrangement is such that when the gauge error has been reduced to close to zero, by either the operation of the tension control circuit or the operation of both the tension and screwdown control circuits, the logic circuitry 38 initiates the reset circuit 37 to restore the gate value.

While it is preferred that the delayed signal from the delay circuit 33 should be applied to adjust the gate value of gate 27, as described in relation to FIGURES 1 to 3, it may alternatively be applied, to the input of the gate 27, in addition to the signal from the detector circuit 22. In this case, once the gate value has been exceeded, the control circuit 16 is initiated into action by the signal from detector 30, slightly in advance of detection of gauge error by the circuit 22.

It will be appreciated that when the mill reverses, and the direction of strip movement is reversed from that shown in FIGURE 1, the roles of the uncoiler 13 and coiler 13A are interchanged, and the connections are altered so that gauge 30 now part-controls the circuit 22, gauge 26 provides the signal representing changes in gauge of the ingoing strip, and the control circuit 14A is controlled by the gauge error signal from detector circuit 22.

I claim:
1. For a rolling mill comprising at least one pair of co-operating rolls, means for passing material between the rolls under tension, and means for adjusting the mill for controlling the outgoing thickness of the material; an automatic gauge control system comprising an error detector giving an error signal representing the departure of the outgoing thickness of the strip between the rolls from a desired value, an adjustable gate circuit to which the error signal is applied and for giving an output signal when the error signal exceeds the gate value, means for setting the gate circuit to a first gate value, means for controlling the mill adjusting means by the output signal to correct the outgoing thickness to reduce the departure substantially to zero, a gauge detector for detecting changes in the ingoing thickness of the material and means controlled by the gauge detector and controlling the gate circuit for reducing the gate value to a lower gate value following the detection of a change in the ingoing thickness and in advance of the detection by the error detector of a corresponding change in the outgoing thickness.

2. An automatic gauge control system according to claim 1 in which the gauge detector gives a change signal on the detection of change in the ingoing gauge, and there are delay means through which the change signal is applied to the gating circuit.

3. An automatic gauge control system according to claim 2 in which the delay means is controlled by the mill speed to give a delay slightly less than the transit time of the material from the secondary detector to the rolls.

4. An automatic gauge control system according to claim 2 in which the gauge detector is arranged to give a change signal representing the rate of change of ingoing thickness.

5. An automatic gauge control system according to claim 2 in which the gauge detector is arranged to give a change signal representing the departure from a predetermined value of the thickness of the ingoing material.

6. An automatic gauge control system according to claim 5 in which there are means for resetting the gating circuit to the first gate value.

7. An automatic gauge control system according to claim 6 in which the resetting means are arranged to reset the gating circuit when the gauge error signal has been restored substantially to zero.

8. An automatic gauge control system according to claim 1 in which the mill adjusting means comprise means for adjusting the tension of the material.

9. An automatic gauge control system according to claim 1 in which the mill adjusting means comprise means for adjusting the roll separation and in which there are means for adjusting the tension of the material and means for adjusting the tension adjusting means by the gauge error signal.

10. An automatic gauge control system according to claim 9 in which the tension adjusting means is arranged to be controlled additionally by the change signal from the supplementary detector.

11. In an automatic gauge control system for a rolling mill comprising at least a pair of cooperating rolls between which the material to be rolled is passed, means for applying tension to the material, and means for adjusting the mill to vary the thickness of the strip leaving the rolls, the control system comprising an error detector for detecting any departure in the outgoing thickness of the material from a desired value, a gauge detector for measuring the ingoing thickness of the material, and means controlled jointly by said two detectors for controlling said mill adjusting means, the improvement according to which said error detector is connected to give said mill adjusting means a signal representing any departure in the thickness of the material when between said rolls from said desired value when said departure exceeds a predetermined minimum and is operative to thereby control said mill adjusting means to maintain substantially constant thickness, and said gauge detector is connected to detect changes in said incoming thickness and to give a transitory signal to said mill adjusting means to render said adjusting means responsive to said error detector when said departure is below said predetermined minimum.

12. An automatic gauge control system according to claim 1 in which the mill adjusting means comprise means for adjusting the setting of the rolls.

References Cited

UNITED STATES PATENTS

| 2,883,895 | 4/1959 | Vossberg | 72—9 |
| 3,054,311 | 9/1962 | Murtland | 72—9 |
| 3,121,354 | 2/1964 | Weremeychick et al. | 72—8 |
| 3,162,069 | 12/1964 | Mc Lay et al. | 72—9 |
| 3,194,036 | 7/1965 | Confer et al. | 72—16 |
| 3,197,986 | 8/1965 | Freedman et al. | 72—9 |

RICHARD J. HERBST, *Primary Examiner.*

A. RUDERMAN, *Assistant Examiner.*